US011530025B2

(12) United States Patent
Zhang et al.

(10) Patent No.: US 11,530,025 B2
(45) Date of Patent: Dec. 20, 2022

(54) FOLDABLE ROTOR BLADE ASSEMBLY AND AERIAL VEHICLE WITH A FOLDABLE ROTOR BLADE ASSEMBLY

(71) Applicant: Hangzhou Zero Zero Technology Co., Ltd., Zhejiang (CN)

(72) Inventors: Long Zhang, Zhejiang (CN); Zhaozhe Wang, Zhejiang (CN); Weiqi Liu, Zhejiang (CN); Xiaonan Cheng, Zhejiang (CN); Tong Zhang, Zhejiang (CN)

(73) Assignee: Hangzhou Zero Zero Technology Co., Ltd.

( * ) Notice: Subject to any disclaimer, the term of this patent is extended or adjusted under 35 U.S.C. 154(b) by 458 days.

(21) Appl. No.: 16/834,452

(22) Filed: Mar. 30, 2020

(65) Prior Publication Data
US 2020/0324874 A1 Oct. 15, 2020

Related U.S. Application Data

(60) Provisional application No. 62/832,480, filed on Apr. 11, 2019.

(51) Int. Cl.
*B64C 1/30* (2006.01)
*B64C 39/02* (2006.01)

(52) U.S. Cl.
CPC ............. *B64C 1/30* (2013.01); *B64C 39/024* (2013.01); *B64C 2201/027* (2013.01); *B64C 2201/108* (2013.01)

(58) Field of Classification Search
CPC ........................................................ B64C 1/30
See application file for complete search history.

(56) References Cited

U.S. PATENT DOCUMENTS

| | | | |
|---|---|---|---|
| 2004/0195436 A1* | 10/2004 | Sinclair ................. | A63H 31/08 244/49 |
| 2018/0201356 A1* | 7/2018 | Cai ....................... | B64C 39/024 |
| 2019/0092457 A1* | 3/2019 | Ohta ..................... | B64C 39/024 |

\* cited by examiner

*Primary Examiner* — Jessica B Wong
(74) *Attorney, Agent, or Firm* — Endurance Law Group PLC

(57) ABSTRACT

An unmanned aerial vehicle includes a fuselage body, a foldable wing assembly and a gear assembly. The foldable wing assembly, including a pair of opposing wing members, is coupled to the fuselage body and positionable in a stowed position and a deployed position. The gear assembly positions the wing members in a stowed position and a deployed position and include a support bracket assembly and a pair of opposing hinge members. The support bracket assembly is coupled to the fuselage body and including first and second support brackets forming a cavity therebetween and a pair of opposing hinge members. The pair of opposing hinge members are pivotably coupled to the support bracket assembly and positioned within the cavity. Each hinge member is coupled to a corresponding wing member and includes a set of gear teeth extending outwardly from an arcuate radially outer surface and coupled in a meshed arrangement.

22 Claims, 12 Drawing Sheets

FOLDABLE ROTOR BLADE ASSEMBLY AND AERIAL VEHICLE WITH A FOLDABLE ROTOR BLADE ASSEMBLY

RELATED APPLICATION

This application claims the benefit of U.S. Provisional Application Ser. No. 62/832,480, filed on Apr. 11, 2019, which is hereby incorporated by reference in its entirety.

TECHNICAL FIELD

This invention relates generally to the unmanned aerial vehicles, and more specifically, to an unmanned aerial vehicle having a foldable wing assembly including a synchronous transmission gear.

BACKGROUND OF THE INVENTION

The propeller of traditional flying vehicles, e.g., drones, typically have either a complex structure or a simple structure. Particularly in drone aircraft, it may be advantageous to have a propeller structure that fulfills its primary function of maintaining the propeller blades in place during operation, while allowing the blades to be moved into a suitable position for transport. Ideally, the blade position for transport minimizes the overall size of the aircraft while minimizing the risk of damage to the propeller blades.

Generally, prior art propeller structures are simple which does not allow the blades to be moved into an arrangement suitable for transport or are too complex with a relatively large number of parts which increases the cost of the aircraft.

The present invention is aimed at one or more of the problems identified above.

SUMMARY OF THE INVENTION

In one aspect of the present invention, an unmanned aerial vehicle having a fuselage body and a foldable wing assembly is provided. The foldable wing assembly is coupled to the fuselage body and is positionable in a stowed position and a deployed position. The foldable wing assembly includes a pair of opposing wing members and a gear assembly. The gear assembly is configured to position the wing members in a stowed position and a deployed position and the gear assembly includes a support bracket assembly and a pair of opposing hinge members, The support bracket assembly is coupled to the fuselage body and includes a first support bracket coupled to a second support bracket such that a cavity is defined between the first support bracket and the second support bracket. The pair of opposing hinge members are pivotably coupled to the support bracket assembly and positioned within the cavity of the support bracket assembly. Each hinge member is coupled to a corresponding wing member for positioning the wing members in the stowed position and the deployed position. Each hinge member includes a set of gear teeth extending outwardly from an arcuate radially outer surface and coupled in a meshed arrangement with a corresponding set of gear teeth of an opposing hinge member such that a movement of one hinge member causes a synchronous movement of the other hinge member.

In another aspect of the present invention, a gear assembly for use with an unmanned aerial vehicle is provided. The unmanned aerial vehicle includes a fuselage body and a foldable wing assembly is provided. The foldable wing assembly is coupled to the fuselage body and is positionable in a stowed position and a deployed position. The foldable wing assembly includes a pair of opposing wing members and a gear assembly. The gear assembly is configured to position the wing members in a stowed position and a deployed position and the gear assembly includes a support bracket assembly and a pair of opposing hinge members, The support bracket assembly is coupled to the fuselage body and includes a first support bracket coupled to a second support bracket such that a cavity is defined between the first support bracket and the second support bracket. The pair of opposing hinge members are pivotably coupled to the support bracket assembly and positioned within the cavity of the support bracket assembly. Each hinge member is coupled to a corresponding wing member for positioning the wing members in the stowed position and the deployed position. Each hinge member includes a set of gear teeth extending outwardly from an arcuate radially outer surface and coupled in a meshed arrangement with a corresponding set of gear teeth of an opposing hinge member such that a movement of one hinge member causes a synchronous movement of the other hinge member.

DETAILED DESCRIPTION OF THE INVENTION

An autonomous aerial system is described and illustrated herein. In one embodiment, the aerial system is a so-called "hopter" unmanned aerial vehicle or drone. The aerial system may be activated by a user, released, and may then hover in the air. While hovering, the aerial system may automatically take pictures and videos for the user with minimum interaction or remote control from the user. After the aerial system has completed taking pictures or videos, the aerial system may perform a controlled landing.

In general, the present invention is directed to an unmanned aerial vehicle that includes a foldable wing assembly that includes a pair of wing members that are positionable in a stowed position and a deployed position. The foldable wing assembly includes a gear assembly that is coupled to the pair of wing members for positioning the wing members in the stowed position and the deployed position. The gear assembly includes a support bracket assembly that is coupled to a fuselage body of the aerial vehicle for supporting the wing members from the fuselage body. A pair of opposing hinge members are pivotably coupled to the support assembly. Each hinge member is also coupled to a corresponding wing member for positioning the corresponding wing member in the stowed position and the deployed position. Each hinge member includes a set of gear teeth that are coupled in meshed arrangement with the set of gear teeth of the opposing hinge member such that a movement of one hinge member causes a synchronous movement of the other hinge member.

As shown in FIGS. 3-18, the present invention achieves the goal to improve multirotor drone's portability. Foldable wing assembly enables the drone to outspread its wings while in use, and to fold its wings while in storage. The Foldable wing assembly enables the drone to outspread or fold the drone's two side wings simultaneously, which brings the users a better experience. The goal of this invention is to make the drone outspread or fold its two side wings simultaneously. This invention improves multirotor drone's portability, brings the users a better using experience.

In the illustrated embodiment, the foldable wing assembly includes two meshed gears coupled to corresponding wing assemblies. The principle of meshing two gears helps to achieve the synchronous transmission effect. And the precision of the meshing is ensured, thereby realizing the outspreading and folding of the wings on both sides of the drone.

Combine the hinge assembly together with the wings, and then allocate the combination to the both sides of the drone. When folding or fold one of the wings, the other wing also moves in the same way.

Figure 7:
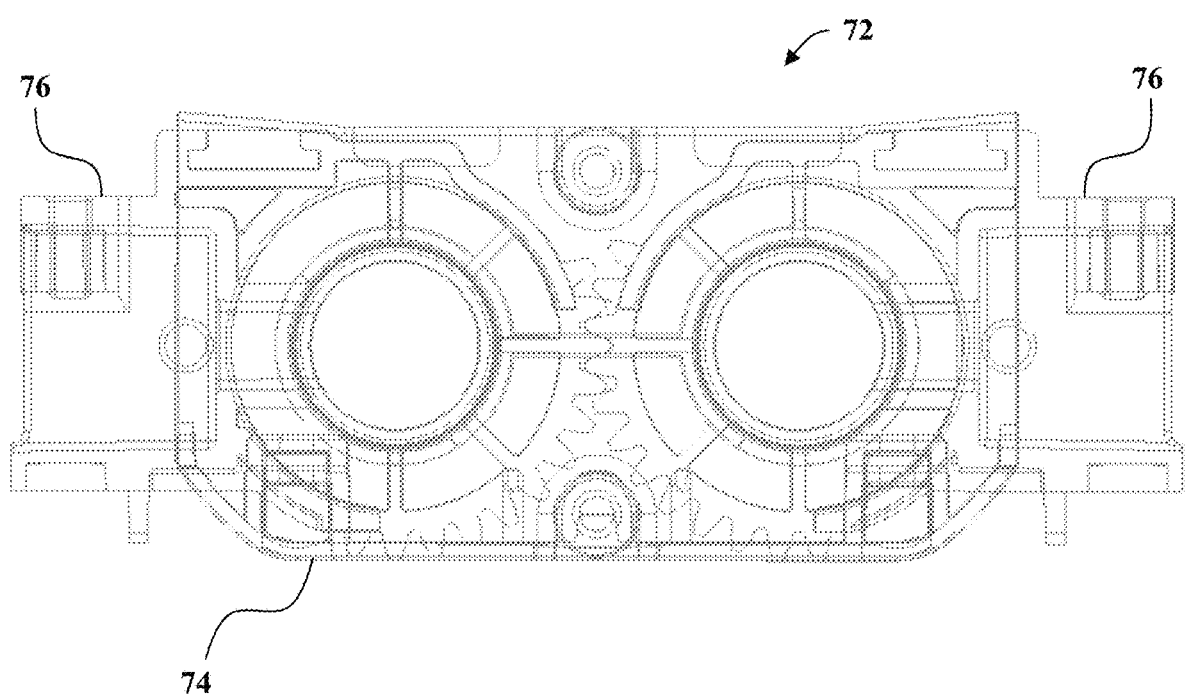
FIG. 7 is a schematic view of a gear assembly that may be used with the foldable wing assembly shown in FIG. 3, according to an embodiment of the present invention.
Figure 8:
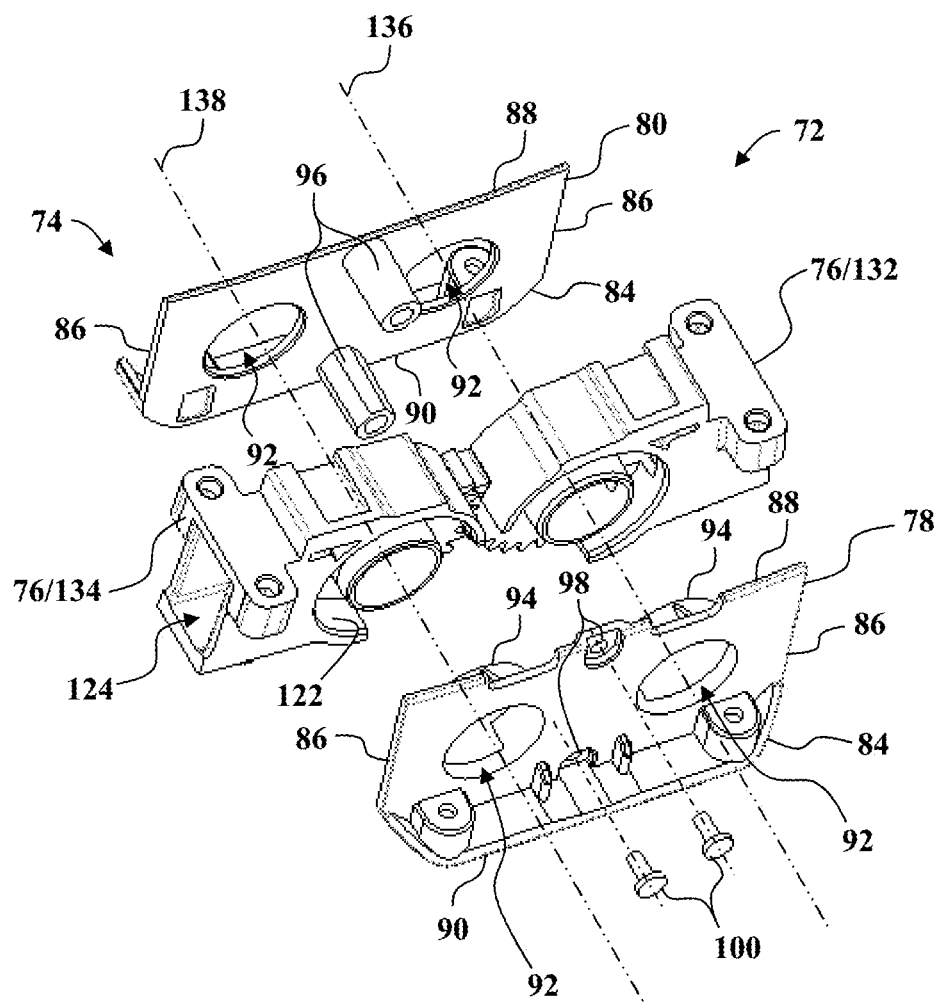
FIG. 8 is an exploded view of the gear assembly shown in FIG. 7.
Figure 9:
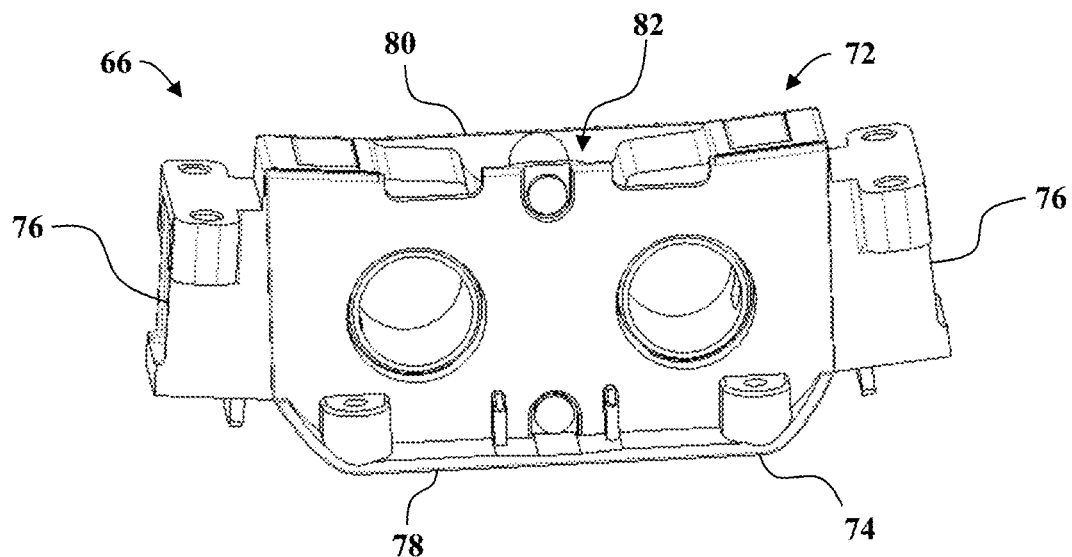
FIG. 9 is a perspective view of the gear assembly shown in FIG. 7 including a pair of hinge assemblies orientated in the deployed position.
Figure 10:
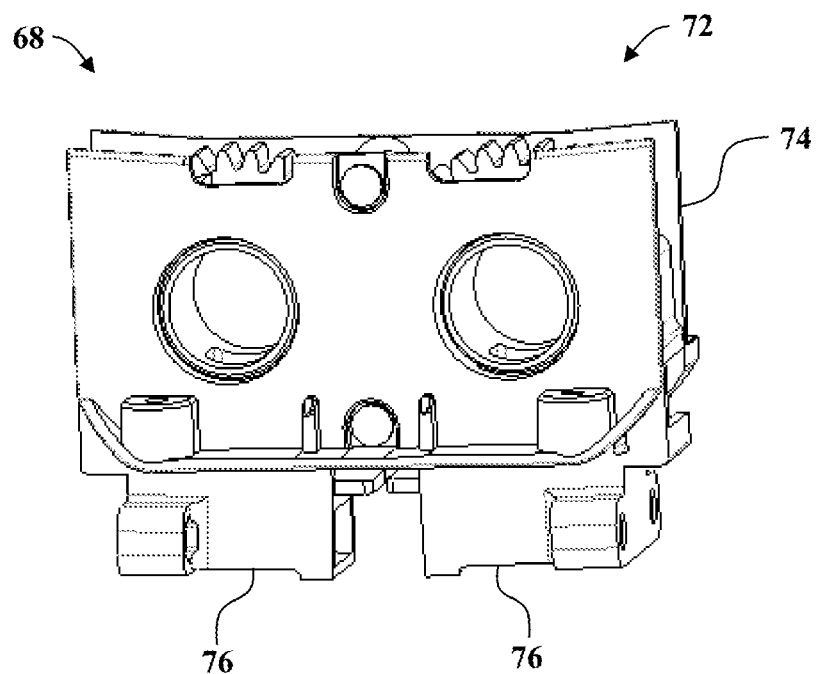
FIG. 10 is a perspective view of the gear assembly shown in FIG. 9 including the pair of hinged assemblies orientated in the stowed position.
Figure 11:
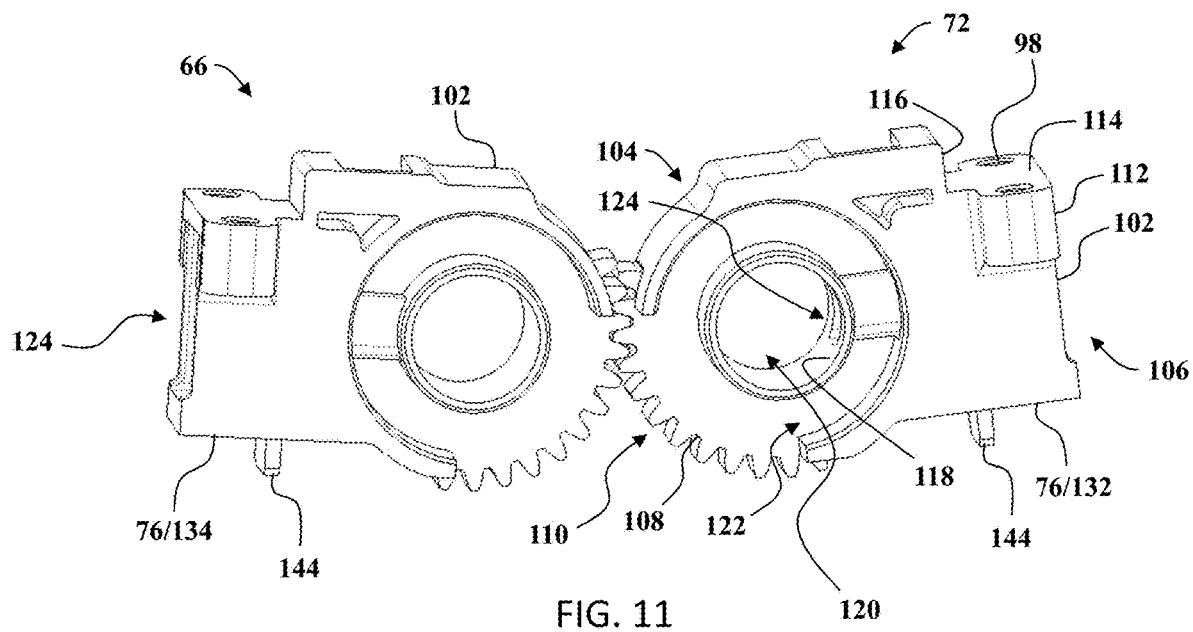
FIG. 11 is a perspective view of the pair of hinge assemblies shown in FIG. 9 orientated in the deployed position.
Figure 12:
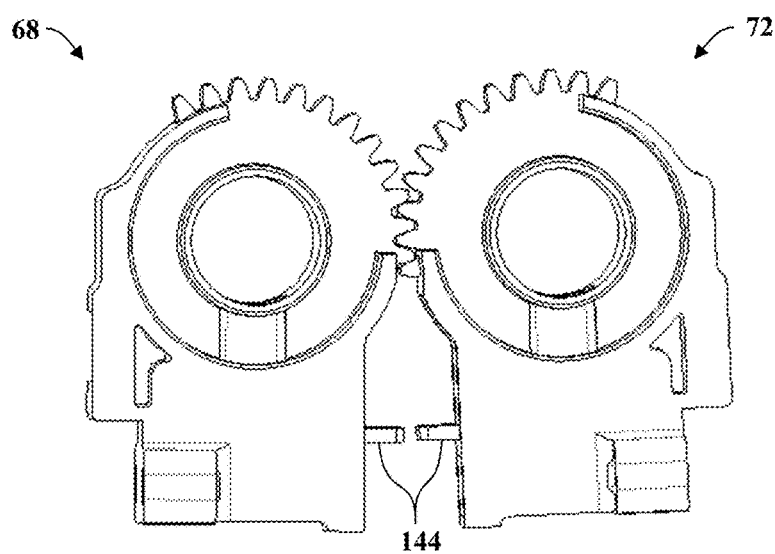
FIG. 12 is a perspective view of the pair of hinge assemblies shown in FIG. 9 orientated in the stowed position.
Figure 13:
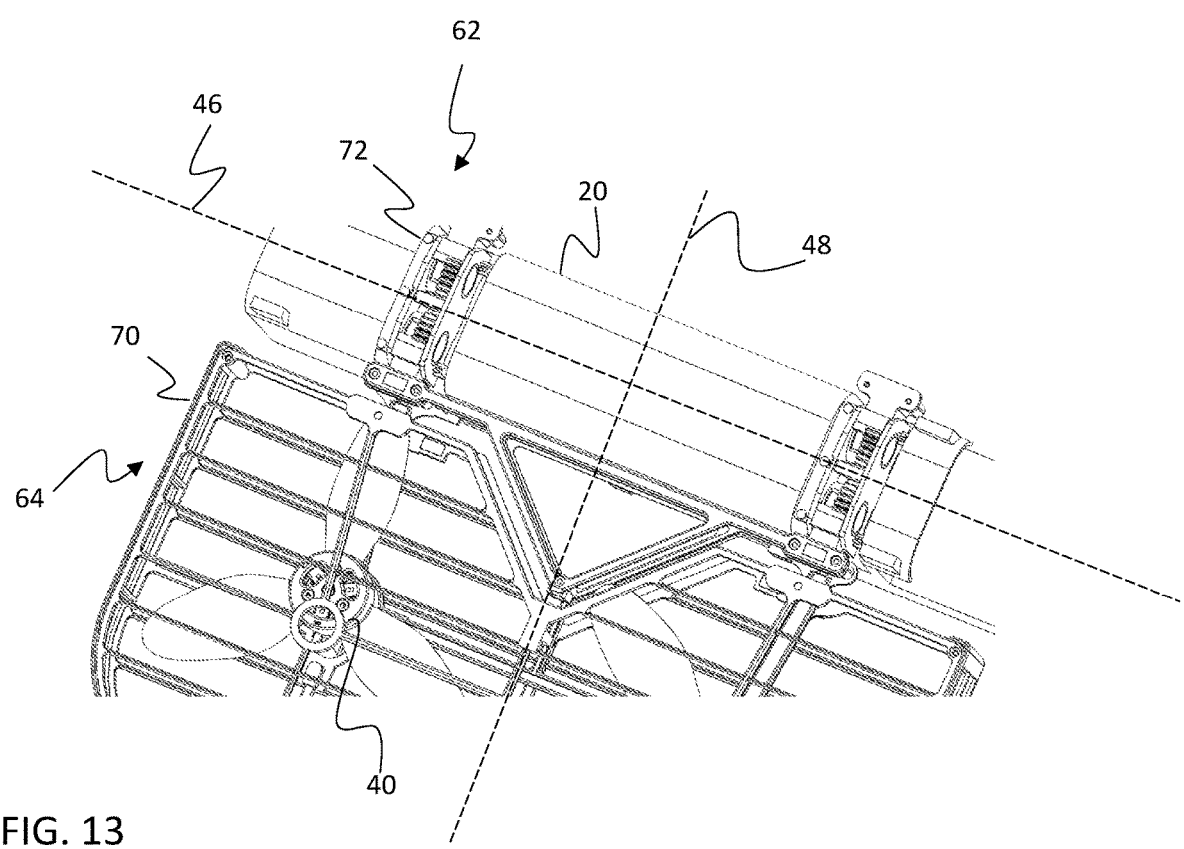
FIG. 13 is a partial perspective view of the aerial vehicle shown in FIG. 3 including the foldable wing assembly, according to an embodiment of the present invention.
Figure 14:
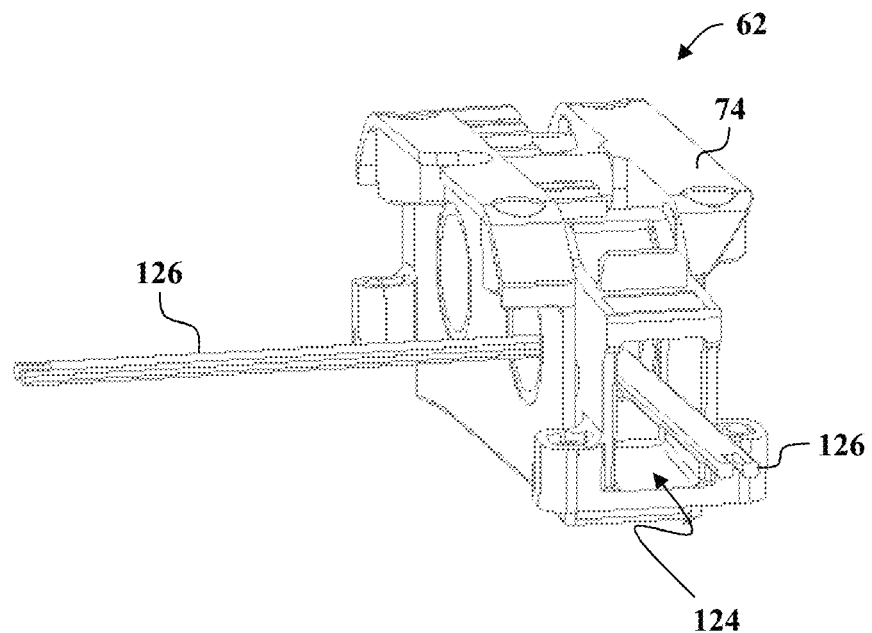
FIG. 14 is a perspective view of the gear assembly shown in FIG. 7.
Figure 15:
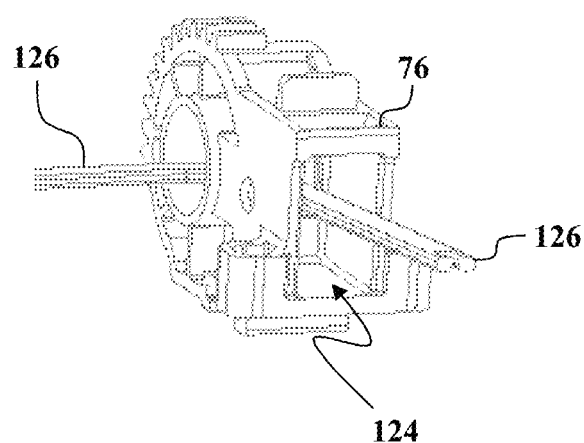
FIG. 15 is a perspective view of a hinge assembly that may be used with the gear assembly shown in FIG. 14.
Figure 16:
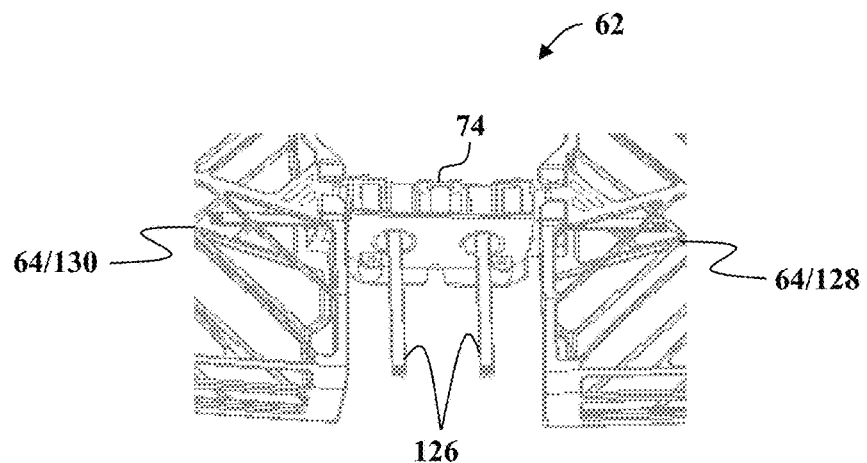
FIG. 16 is a perspective view of the foldable wing assembly shown in FIG. 4.
Figure 17:
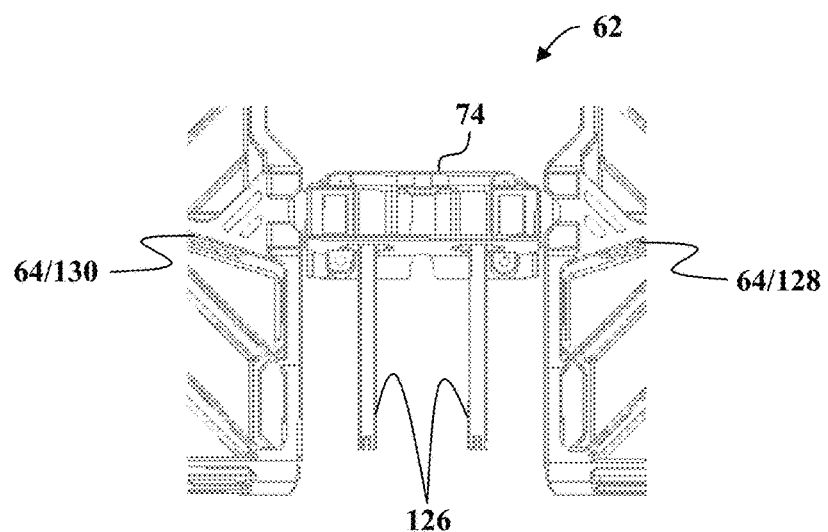
FIG. 17 is a top view of the foldable wing assembly shown in FIG. 16.
Figure 18:
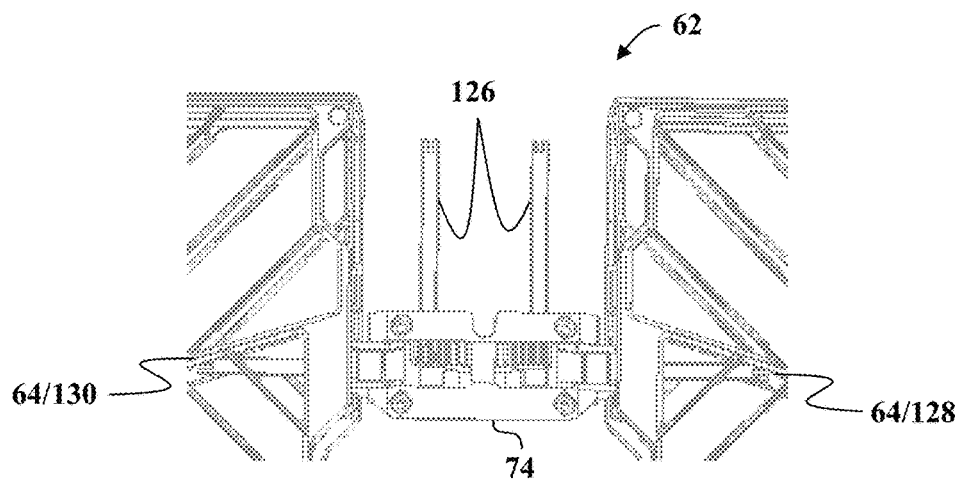
FIG. 18 is a bottom view of the foldable wing assembly shown in FIG. 16.

For example, FIG. 7 illustrates the rotating shaft assembly, which is consists of 2 gears (e.g. hinge members) and 2 gear fixing pieces (e.g. support brackets). As shown in FIGS. 11 and 12, the design includes two intermeshing gears (defined as first hinge and second hinge). FIG. 11 illustrates the first hinge and the second hinge in a horizontal state, and FIG. 12 illustrates the first hinge and the second hinge in a vertical state. The X, Y, Z directions of the two meshing gears can be fixed by using two screws to set two structural brackets on both sides of the first hinge and the second hinge, which constitutes a gear assembly. For example, FIG. 9 illustrates the gear assembly in an outspread status, and FIG. 10 illustrates the gear assembly in a fold status. FIG. 8 illustrates the components of the gear assembly.

Figure 5:
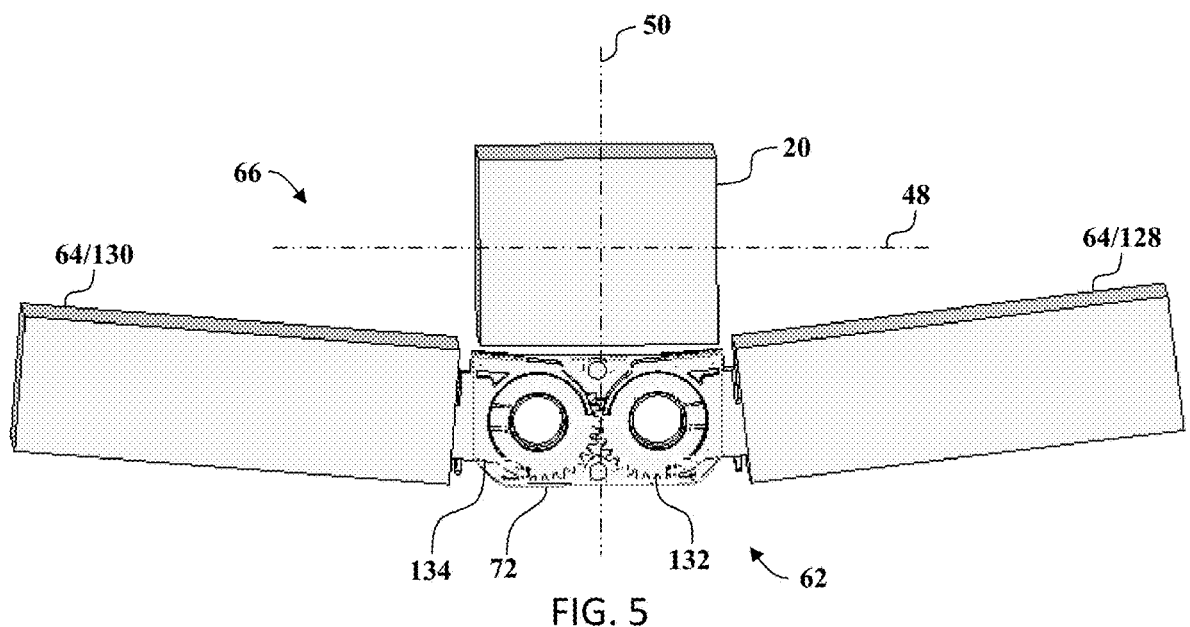
FIG. 5 is a sectional view of the foldable wing assembly shown in FIG. 3 in a deployed position.
Figure 6:
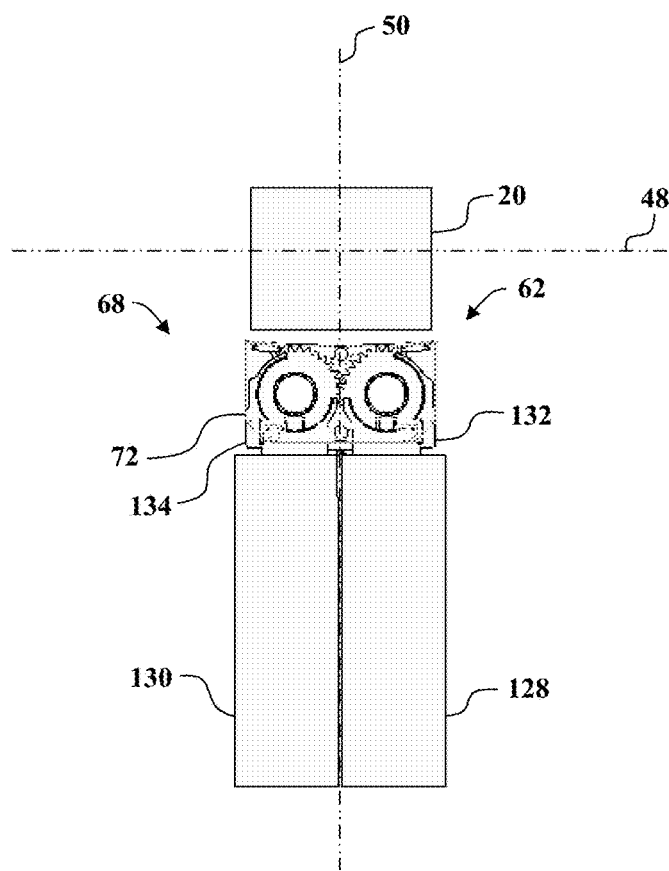
FIG. 6 is a sectional view of the foldable wing assembly shown in FIG. 3 in a stowed position.

The gear assembly is used as a rotating shaft. When the gear assembly connects to the drone and wings, the synchronous transmission of the wings can be realized, and the wings can be opened and closed simultaneously. For example, FIG. 5 illustrates the wings outspread, and FIG. 6 illustrates the wings folded.

The following description of the embodiments of the invention is not intended to limit the invention to these embodiments, but rather to enable any person skilled in the art to make and use this invention. With reference to the drawings and in operation, a system 10 for controlling an aerial vehicle 12, for example a drone or other unmanned aerial vehicle, is provided. The system 10 may include a remote device 14 with a control client 16. The control client 16 provides a user interface that allows a user 18 to send instructions to the aerial vehicle 12 to control operation thereof. As discussed in more depth below, the aerial vehicle 12 includes one or more cameras for obtaining pictures and/or video which may be sent to the remote device 14 and/or stored in memory on the aerial vehicle 12.

Overview of the System 10 and the Aerial Vehicle 12

Figure 1:
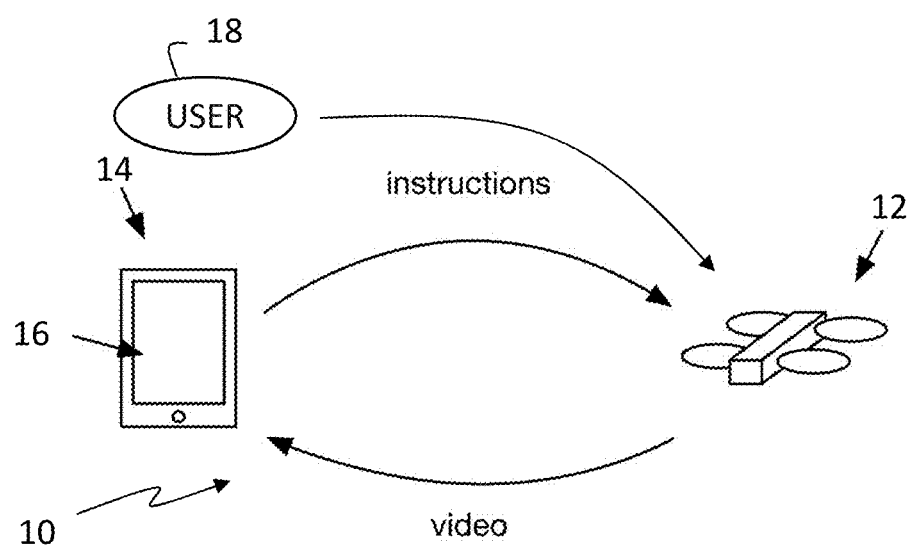
FIG. 1 is a schematic representation of an aerial system for controlling an unmanned aerial vehicle, according to an embodiment of the present invention.
Figure 2:
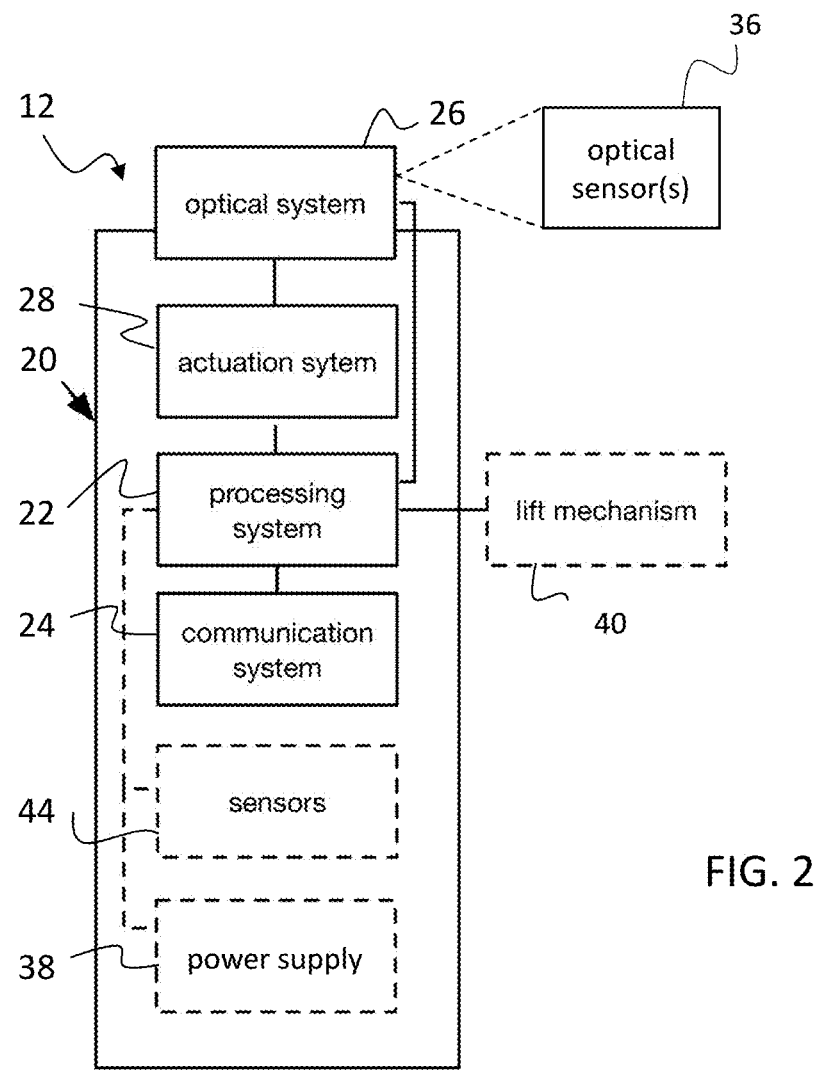
FIG. 2 is a schematic representation of an unmanned aerial vehicle that may be used with the aerial system shown in FIG. 1, according to an embodiment of the present invention.
Figure 3:
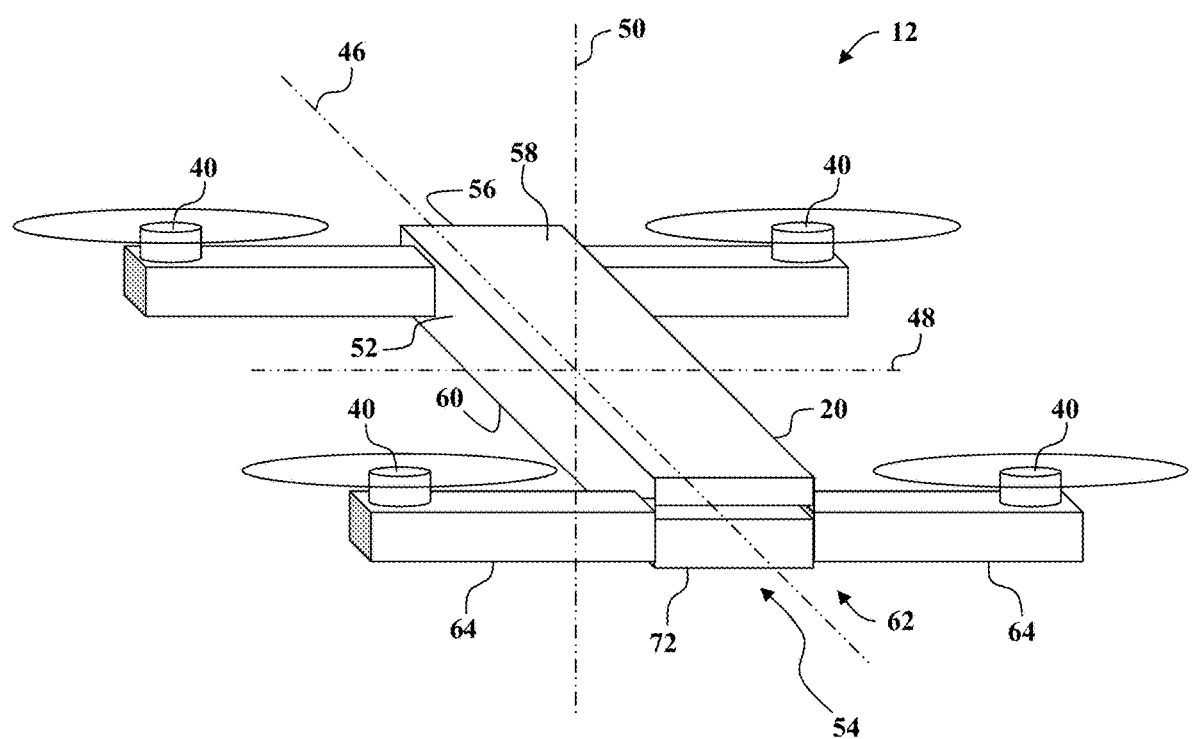
FIG. 3 is perspective view of an unmanned aerial vehicle including a foldable wing assembly, according to an embodiment of the present invention.

An exemplary aerial vehicle 12 and control system 10 is shown in FIGS. 1-3. The control client 16 of the aerial vehicle 12 functions to receive data from the aerial vehicle 12, including video images and/or video, and control visual display on the remote device 14. The control client 16 may also receive operation instructions and facilitate aerial vehicle 12 remote control based on operation instructions. The control client 16 is preferably configured to execute on a remote device 14, but can alternatively be configured to execute on the aerial vehicle 12 or on any other suitable system. As discussed above, and more fully below, the aerial vehicle 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial vehicle 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial vehicle 12 functions to fly within a physical space, capture video, stream the video in near-real time to the remote device 14, and operate based on operation instructions received from the remote device 14.

The aerial vehicle 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial vehicle 12 can additionally function to move the optical sensor's field of view within the physical space. For example, the aerial vehicle 12 can control macro movements (e.g., large FOV changes, on the order of meter adjustments), micro movements (e.g., small FOV changes, on the order of millimeter or centimeter adjustments), or any other suitable movement.

The aerial vehicle 12 can perform certain functionality based on onboard processing of sensor data from onboard sensors. This functionality may include, but is not limited to:
  Take-off and landing;
  Owner recognition;
  Facial recognition;
  Speech recognition;
  Facial expression and gesture recognition; and,
  Control, e.g., motion, of the aerial system based on owner, facial, expression and gesture recognition, and speech recognition.

In the illustrated embodiment, the aerial vehicle 12 includes a fuselage body 20, a processing system 22, a communication system 24, an optical system 26, and an actuation mechanism 28 mounting the optical system 26 to the body 20. The aerial vehicle 12 can additionally or alternatively include one or more optical sensors 36, power supply 38, lift mechanisms 40, additional sensors 44, or any other suitable component (see below).

The body 20 of the aerial vehicle 12 functions to support, mechanically protect, and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material.

In the illustrated embodiment, three mutually perpendicular axes 46, 48, and 50 extend through the aerial vehicle 12, and are used to define a three-dimensional Cartesian coordinate system relative to aerial vehicle 12. For example, the fuselage body 20 can define a longitudinal axis 46, a lateral axis 48, and a transverse axis 50. The longitudinal axis 46 extends lengthwise along the fuselage body 20, the lateral axis 48 extends widthwise along the fuselage body 20 and is orientated perpendicular to the longitudinal axis 46, and the transverse axis 50 is orientated perpendicular to the longitudinal axis 46 and to the lateral axis 48. The fuselage body 20 may include a plurality of sidewalls 52 that extend between a front end 54 and an opposite back end 56 (e.g., opposing the front end along the longitudinal axis 46), and between a top portion 58 and an opposite bottom portion 60 (e.g., opposing the top along the transverse axis 50). In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured and may define any other suitable reference system.

The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial vehicle 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The processing system 22 of the aerial vehicle 12 functions to control aerial system operation. The processing system 22 can: stabilize the aerial vehicle 12 during flight (e.g., in an embodiment in which coaxial rotors are used, control the rotors to minimize aerial system wobble inflight); receive, interpret, and operate the aerial vehicle 12 based on remote control instructions; and receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors (e.g., CPU, GPU, microprocessor, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial vehicle 12 and mounted to the body 20, but can alternatively be otherwise related to aerial system components.

The processing system 22 is preferably configured to receive and interpret measurements sampled by the sensors 36, 44, more preferably by combining measurements sampled by disparate sensors (e.g., combining camera and accelerometer data). The aerial vehicle 12 can include one or more processing systems, wherein different processors can perform the same functionality (e.g., function as a multi-core system), or be specialized. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial vehicle 12 functions to send and/or receive information from the remote device 14. The communication system 24 is preferably connected to the processing system 22, such that the communication system 24 sends and/or receives data form the processing system 22, but can alternatively be connected to any other suitable component. The aerial vehicle 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial vehicle 12 functions to record images of the physical space proximal the aerial vehicle 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the bottom end of the body 20, but can optionally be mounted to the front, top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial vehicle 12 can include one or more optical systems 26 of same or different type, mounted to the same or different position. In one variation, the aerial vehicle 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 can include a high-definition optical sensor 36, while the second optical system 26 can include a low definition optical sensor 36. However, the optical system or systems 26 can be otherwise configured.

The optical system 26 can include one or more optical sensors 36. The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial vehicle 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or supply 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The power supply 38 of the aerial vehicle 12 functions to power the active components of the aerial vehicle 12. The power supply 38 is preferably mounted to the body 20, and electrically connected to all active components of the aerial vehicle 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

A lift mechanism 40 of the aerial vehicle 12 functions to enable aerial system flight. The lift mechanism 40 preferably includes a set propeller rotor blades driven by one or more motors, but can alternatively include any other suitable propulsion mechanism. The lift mechanism 40 is preferably mounted to the body 20 and controlled by the processing system 22, but can alternatively be otherwise mounted to the aerial vehicle 12 and/or controlled. The aerial vehicle 12 can include multiple lift mechanisms 40. In one example, the aerial vehicle 12 includes four lift mechanisms 40 (e.g., two pairs of lift mechanisms 40), wherein the lift mechanisms 40 are substantially evenly distributed about the perimeter of the aerial vehicle 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial vehicle 12 (e.g., the physical space proximal the aerial vehicle 12), or any other suitable parameter. The sensors 44 are preferably mounted to the body 20 and controlled by the processing system 22, but can alternatively be mounted to any other suitable component and/or otherwise controlled. The aerial vehicle 12 can include one or more sensors 36, 44. Examples of sensors that can be used include: orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial vehicle 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial vehicle 12 can additionally include inputs (e.g., microphones, cameras, etc.), outputs (e.g., displays, speakers, light emitting elements, etc.), or any other suitable component.

The aerial vehicle 12 can optionally be used with a remote computing system, or with any other suitable system. The aerial vehicle 12 functions to fly, and can additionally function to take photographs, deliver loads, and/or relay wireless communications. The aerial vehicle 12 is preferably a rotorcraft (e.g., hopter, quadcopter, helicopter, cyclocopter, etc.), but can alternatively be a fixed-wing aircraft, aerostat, or be any other suitable aerial vehicle 12.

The remote computing system may be a remote device 14 that functions to receive auxiliary user inputs, and can additionally function to automatically generate control instructions for and send the control instructions to one or more aerial systems 12. Each aerial vehicle 12 can be controlled by one or more remote computing systems (e.g., one or more remote devices 14). The remote computing system preferably controls the aerial vehicle 12 through a client (e.g., a native application, browser application, etc.), but can otherwise control the aerial vehicle 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. In some embodiments, control of the aerial vehicle 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial vehicle 12.

In at least one embodiment, the aerial vehicle 12 may be controlled without physical interaction with the remote device 14, however, a display of the remote device 14 may be used to display images and/or video relayed from the aerial vehicle 12 which may aid the user 18 in controlling the aerial vehicle 12. In addition, sensors 36, 44 associated with the remote device 14, e.g. camera(s) and/or a microphone (not show) may relay data to the aerial vehicle 12, e.g. when the aerial vehicle 12 is too far away from the user 18. The sensor data relayed from the remote device 14 to the aerial vehicle 12 is used in the same manner as the sensor data from the on-board sensors 36, 44 are used to control the aerial vehicle 12 using user expression.

In this manner, the aerial vehicle 12 may be fully controlled, from start to finish, either (1) without utilization of a remote device 14, or (2) without physical interaction with the remote device 14. Control of the aerial vehicle 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial vehicle 12 during flight and other features, such as triggering of photo and/or video capturing. As discussed above, the aerial vehicle 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial vehicle 12 includes an optical system 26 that includes one or more optical sensor 36, such as a camera. The at least one on-board camera is configured for live video streaming and computer vision analysis. Optionally the aerial vehicle 12 can have at least one depth sensor (or stereo-vision pair) for multi-pixel depth sensing. Optionally the aerial vehicle 12 can have at least one microphone on board for voice recognition and control.

In general, in order to provide full control of the aerial vehicle 12, a plurality of user/drone interactions or activities from start to end of an aerial session are provided. The user/drone interactions, include, but are not limited to take-off and landing, owner recognition gesture recognition, facial expression recognition, and voice control.

Foldable Propeller Assembly

With reference to FIGS. 3-13, in the illustrated embodiment, the aerial vehicle 12 includes one or more foldable wing assemblies 62. The foldable wing assembly 62 includes a pair of opposing wing members 64 that are pivotably coupled to the fuselage body 20 and positionable in a deployed position 66 and a stowed position 68. Each wing member 64 includes a support frame 70 and a lift mechanism 40 coupled to the support frame 70. In one embodiment, in the deployed position 66, each wing member 64 extends outwardly from the fuselage body 20 in opposite directions, and in the stowed position 68, each wing member 64 extends outwardly from the fuselage body 20 in the same direction. For example, as shown in FIGS. 5-6, in the illustrated embodiment, in the deployed position 66, the pair of wing members 64 extending outwardly from the fuselage body 20 along the lateral axis 48, and in the stowed position 68, the pair of wing members 64 extending outwardly from the fuselage body 20 along the transverse axis 50. In other embodiments, in the stowed position 68, the pair of wing members 64 may extending outwardly from the fuselage body 20 along the longitudinal axis 46.

In the illustrated embodiment, the foldable wing assembly 62 includes a gear assembly 72 that is coupled to the fuselage body 20 and to each wing member 64. The gear assembly 72 is configured to support the pair of wing members 64 from the fuselage body 20 and to synchronously move the pair of wing members 64 between the stowed position 68 and the deployed position 66.

The gear assembly 72 includes a support bracket assembly 74 that is coupled to the fuselage body 20, and a pair of opposing hinge members 76 that are pivotably coupled to the support bracket assembly 74. The support bracket assembly 74 includes a first support bracket 78 and second support bracket 80. The first support bracket 78 is coupled to the second support bracket 80 such that a bracket cavity 82 is defined between the first support bracket 78 and the second support bracket 80. The pair of opposing hinge members 76 are positioned within the bracket cavity 82 and coupled to the support bracket assembly 74. Each support bracket 78, 80 includes a bracket body 84 including a pair of side endwalls 86 extending between a top endwall 88 and a bottom endwall 90, and a pair of positioning openings 92 defined through the bracket body 84. The first support bracket 78 includes a pair of arcuate positioning flanges 94 that extend outwardly from the outer surface of the bracket body 84 towards the second support bracket 80. Each arcuate positioning flange 94 is orientated about a perimeter of a corresponding positioning opening 92. The second support bracket 80 includes a pair of connection members 96 that extend outwardly from an outer surface of the bracket body 84 towards the first support bracket 78. The pair of connection members 96 are positioned adjacent to the top endwall 88 and to the bottom endwall 90. The first support bracket 78 includes a pair of fastener openings 98 corresponding to the pair of connection members 96. A pair of fasteners 100 are inserted through the fastener openings 98 and coupled to the connection members 96 to couple to the first support bracket 78 to the second support bracket 80.

Each hinge member 76 is coupled to a corresponding wing member 64 and is configured to position the corresponding wing member 64 in the stowed position 68 and the deployed position 66. Each hinge member 76 includes a hinge body 102 that includes an outer surface that extends between a first end 104 and an opposite second end 106. The first end 104 includes an arcuate radially outer surface 108 and a set of gear teeth 110 extending outwardly from the arcuate radially outer surface 108. The second end 106 includes a support flange 112 that is adapted to be coupled to a corresponding wing member 64 to support the wing member 64 from the support bracket assembly 74. The support flange 112 includes a planar mounting surface 114 and a plurality of fastener openings 98 defined through the mounting surface 114 to facilitate coupling the wing member 64 to the support flange 112 with a plurality of fasteners. For example, in one embodiment, the support frame 70 of the wing member 64 may be coupled to the support flange 112 to support the wing member 64 from the gear assembly 72. The hinge member 76 may also include a positioning shoulder 116 extending outwardly from a top surface of the hinge body 102. The positioning shoulder 116 is orientated adjacent to the support flange 112 and normal to the mounting surface 114 to facilitate positioning the wing member 64 onto the support flange 112.

In the illustrated embodiment, the hinge body 102 also includes a radially inner surface 118 that defines a cylindrical cavity 120 that extends through the hinge body 102. An arcuate slot 122 is defined along an outer surface of the hinge body 102 and extends around a perimeter of the cylindrical cavity 120. The arcuate slot 122 is sized and shaped to receive a corresponding arcuate positioning flange 94 therein to pivotably couple the hinge member 76 to the support bracket assembly 74. The hinge body 102 also includes an interior surface that defines a cable cavity 124 that extends through the hinge body 102 between an opening defined along the radially inner surface 118 of the cylindrical cavity 120 and an opening defined through the second end 106. The cable cavity 124 is sized and shaped to receive one or more power and/or communication cables 126 that extend between the fuselage body 20 and a corresponding lift mechanism 40. The power/communication cables 126 operatively couple the corresponding lift mechanism 40 to the processing system 22 to enable the processing system 22 to transmit power signals and communication signals to the lift mechanism 40 to control the operation of the lift mechanism 40.

In the illustrated embodiment, the foldable wing assembly 62 includes a first wing member 128 and an opposite second wing member 130. The gear assembly 72 includes a first hinge member 132 that is coupled to the first wing member 128 and a second hinge member 134 that is coupled to the second wing member 130. The first hinge member 132 is coupled to the support bracket assembly 74 such that the first hinge member 132 is pivotable about a first pivot axis 136. Similarly, the second hinge member 134 is coupled to the support bracket assembly 74 such that the second hinge member 134 is pivotable about a second pivot axis 138.

The first and second hinge members 132, 134 are coupled to the support bracket assembly 74 such that the set of gear teeth 110 of the first hinge member 132 is meshed with the set of gear teeth 110 of the second hinge member 134. In addition, the second hinge member 134 is orientated in a mirrored relationship with the first hinge member 132 such that a rotation of the first hinge member 132 about the first pivot axis 136 causes a rotation of the second hinge member 134 about the second pivot axis 138, and a rotation of the second hinge member 134 about the second pivot axis 138 causes a rotation of the first hinge member 132 about the first pivot axis 136. In this manner, the first and second hinge members 132, 134 are configured to move in a synchronous manner between the stowed position 68 and the deployed position 66. For example, if an operator of the aerial vehicle 12 desires to move the wing members 64 from the stowed position 68 to the deployed position 66, the operator may move one of the first or second wing members 128, 130 towards the deployed position 66 to cause the gear assembly 72 to synchronously move the other wing member 64 towards the deployed position 66. Similarly, if the operator desires to move the wing members 64 to the stowed position 68, the operator may move one of the first or second wing members 128, 130 towards the stowed position 68 to cause the gear assembly 72 to synchronously move the other wing member 64 towards the stowed position 68.

In addition, the hinge members 76 may include one or more magnets coupled to the outer surface of the hinge body 102 to facilitate positioning the wing members 64 in the stowed and deployed positions. For example, in one embodiment, each hinge member 76 may include one or more deployed position magnets 140 coupled to an upper portion of the hinge body 102 to facilitate coupling the wing members 64 in the deployed position 66 and/or one or more stowed position magnets 142 coupled to an lower portion of the hinge body 102 to facilitate coupling the wing members 64 in the stowed position 68. In addition, the first and second hinge members 132, 134 may include a spacing flange 144 extending outward from the outer surface of the second end 106 of the hinge body 102. Each spacing flange 144 is orientated such that the spacing flanges contact each other with foldable wing assembly 62 in the stowed position 68 to limit a rotation of each wing member 64 about the corresponding pivot axis.

Figure 4:
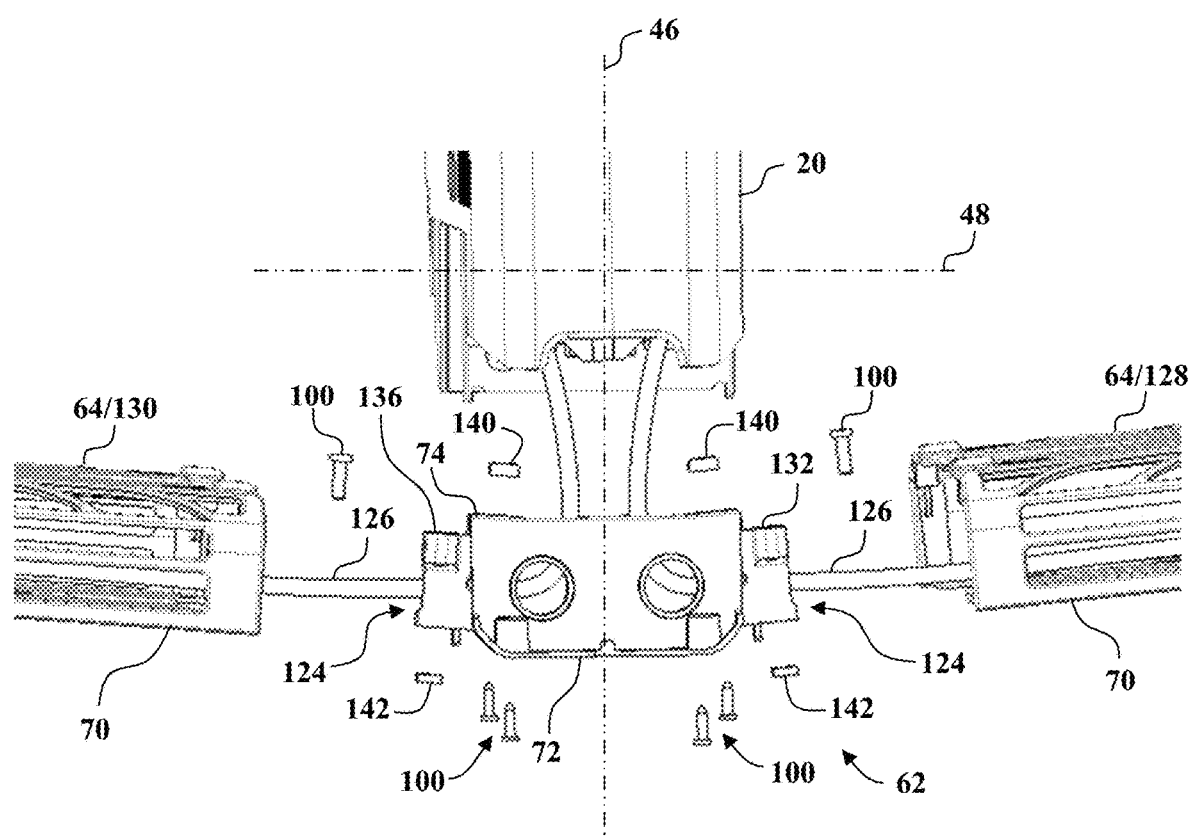
FIG. 4 is an enlarged view of the foldable wing assembly shown in FIG. 3.

Referring to FIG. 4, the assembly relationships of each components are listed below:
1.) Shaft assembly (e.g. gear assembly 72) and drone's main body 20 attracted by deployed position magnets 140. Fastener screws 100 are for fixation.
2.) Shaft assembly (e.g. gear assembly 72) and left wing 130 are attracted by stowed position magnets 142, fixed by fastener screw.
3.) Shaft assembly (e.g. gear assembly 72) and right wing 128 are attracted by stowed position magnets 142, fixed by fastener screw.
4.) First cable assembly wire 126 reach to drone's main body 20 via shaft assembly (e.g. gear assembly 72).
5.) Second cable assembly wire 126 reach to drone's main body 20 via shaft assembly (e.g. gear assembly 72).

The present invention provides an advantage over known wing assemblies by providing the gear meshing principle with synchronous transmission mechanism, and one fixing piece (e.g. support bracket) installed on each side of the shaft assembly, to reduce the impact of an external force to protect the gears. The fixing pieces can effectively reduce the sway of the drone and its wings.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:
1. An unmanned aerial vehicle, comprising:
a fuselage body; and
a foldable wing assembly coupled to the fuselage body, the foldable wing assembly positionable in a stowed position and a deployed position including:
a pair of opposing wing members; and
a gear assembly for positioning the wing members in a stowed position and a deployed position, the gear assembly including:
a support bracket assembly coupled to the fuselage body, the support bracket assembly including a first support bracket coupled to a second support bracket such that a cavity is defined between the first support bracket and the second support bracket; and
a pair of opposing hinge members pivotably coupled to the support bracket assembly and positioned within the cavity of the support bracket assembly, each hinge member coupled to a corresponding wing member for positioning the wing members in the stowed position and the deployed position, each hinge member including a set of gear teeth extending outwardly from an arcuate radially outer surface and coupled in a meshed arrangement with a corresponding set of gear teeth of an opposing hinge member such that a movement of one hinge member causes a synchronous movement of the other hinge member.

2. An unmanned aerial vehicle, as set forth in claim 1, wherein the fuselage body has a longitudinal axis, a lateral axis and a transverse axis, the longitudinal axis extending lengthwise along the fuselage body, the lateral axis extending widthwise along the fuselage body and the transverse axis being perpendicular to the longitudinal and lateral axis, wherein the pair of opposing wing members extend along the lateral axis when in the deployed position and extend along the transverse axis when in the stowed position.

3. An unmanned aerial vehicle, as set forth in claim 1, wherein the fuselage body has a longitudinal axis, a lateral axis and a transverse axis, the longitudinal axis extending lengthwise along the fuselage body, the lateral axis extending widthwise along the fuselage body and the transverse axis being perpendicular to the longitudinal and lateral axis, wherein the pair of opposing wing members extend along the lateral axis when in the deployed position and extend along the longitudinal axis when in the stowed position.

4. An unmanned aerial vehicle, as set forth in claim 1, wherein each support bracket includes a bracket body and a pair of positioning openings defined through the bracket body, the first support bracket including a pair or arcuate positioning flanges that extend outwardly from the bracket body of the first support bracket towards the second support bracket, each arcuate positioning flange being orientated about a perimeter of a corresponding positioning opening.

5. An unmanned aerial vehicle, as set forth in claim 4, wherein the second bracket includes a pair of connection members that extend outwardly from the bracket body of the second support bracket towards the first support bracket, the first support bracket includes a pair of fastener openings corresponding to the pair of connection members, the connection members and fasteners openings being configured to receive fasteners to couple the first and second support brackets together.

6. An unmanned aerial vehicle, as set forth in claim 1, each hinge member having a first end and a second end, the arcuate radially outer surface being located at the first end, the second end of each hinge member including a support flange configured to be coupled to the corresponding wing member.

7. An unmanned aerial vehicle, as set forth in claim 6, wherein each support flange includes a planar mounting surface and a plurality of fastener openings defined through the mounting surface to facilitate coupling of the corresponding wing member via a plurality of fasteners.

8. An unmanned aerial vehicle, as set forth in claim 6, each hinge member having a hinge body and a positioning shoulder that extends outwardly from a top surface of the hinge body, the positioning shoulder being orientated adjacent the support flange and normal to the mounting surface to facilitate positioning the wing member relative to the support flange.

9. An unmanned aerial vehicle, as set forth in claim 8, each hinge body including a radially inner surface defining a cylindrical cavity that extends through the hinge body, each hinge body further including an arcuate slot defined along an outer surface of the hinge body, the arcuate slot being configured to receive a corresponding arcuate positioning flange therein to pivotably couple the hinge member to the support bracket assembly.

10. An unmanned aerial vehicle, as set forth in claim 9, wherein each hinge body includes a cable cavity that extends through the hinge body from the radially inner surface to the second end, the cable cavity being configured to receive one or more power and/or communication cables.

11. An unmanned aerial vehicle, as set forth in claim 10, further including one or more magnets coupled to the outer surface of the hinge body to facilitate positioning of the wing members in the stowed and deployed positions.

12. A gear assembly for use in an unmanned aerial vehicle, the unmanned aerial vehicle including a fuselage body and a foldable wing assembly coupled to the fuselage body, the foldable wing assembly positionable in a stowed position and a deployed position the foldable wing assembly including a pair of opposing wing members, the gear assembly for assembly for positioning the wing members in a stowed position and a deployed position, the gear assembly including:
 a support bracket assembly coupled to the fuselage body, the support bracket assembly including a first support bracket coupled to a second support bracket such that a cavity is defined between the first support bracket and the second support bracket; and
 a pair of opposing hinge members pivotably coupled to the support bracket assembly and positioned within the cavity of the support bracket assembly, each hinge member coupled to a corresponding wing member for positioning the wing members in the stowed position and the deployed position, each hinge member including a set of gear teeth extending outwardly from an arcuate radially outer surface and coupled in a meshed arrangement with a corresponding set of gear teeth of an opposing hinge member such that a movement of one hinge member causes a synchronous movement of the other hinge member.

13. A gear assembly, as set forth in claim 12, wherein the fuselage body has a longitudinal axis, a lateral axis and a transverse axis, the longitudinal axis extending lengthwise along the fuselage body, the lateral axis extending widthwise along the fuselage body and the transverse axis being perpendicular to the longitudinal and lateral axis, wherein the pair of opposing wing members extend along the lateral axis when in the deployed position and extend along the transverse axis when in the stowed position.

14. A gear assembly, as set forth in claim 12, wherein the fuselage body has a longitudinal axis, a lateral axis and a transverse axis, the longitudinal axis extending lengthwise along the fuselage body, the lateral axis extending widthwise along the fuselage body and the transverse axis being perpendicular to the longitudinal and lateral axis, wherein the pair of opposing wing members extend along the lateral axis when in the deployed position and extend along the longitudinal axis when in the stowed position.

15. A gear assembly, as set forth in claim 12, wherein each support bracket includes a bracket body and a pair of positioning openings defined through the bracket body, the first support bracket including a pair or arcuate positioning flanges that extend outwardly from the bracket body of the first support bracket towards the second support bracket, each arcuate positioning flange being orientated about a perimeter of a corresponding positioning opening.

16. A gear assembly, as set forth in claim 15, wherein the second bracket includes a pair of connection members that extend outwardly from the bracket body of the second support bracket towards the first support bracket, the first support bracket includes a pair of fastener openings corresponding to the pair of connection members, the connection members and fasteners openings being configured to receive fasteners to couple the first and second support brackets together.

17. A gear assembly, as set forth in claim 12, each hinge member having a first end and a second end, the arcuate radially outer surface being located at the first end, the second end of each hinge member including a support flange configured to be coupled to the corresponding wing member.

18. A gear assembly, as set forth in claim 17, wherein each support flange includes a planar mounting surface and a plurality of fastener openings defined through the mounting surface to facilitate coupling of the corresponding wing member via a plurality of fasteners.

19. A gear assembly, as set forth in claim 17, each hinge member having hinge body and a positioning shoulder that extends outwardly from a top surface of the hinge body, the positioning shoulder being orientated adjacent the support flange and normal to the mounting surface to facilitate positioning the wing member relative to the support flange.

20. A gear assembly, as set forth in claim 19, each hinge body including a radially inner surface defining a cylindrical cavity that extends through the hinge body, each hinge body further including an arcuate slot defined along an outer surface of the hinge body, the arcuate slot being configured to receive a corresponding arcuate positioning flange therein to pivotably couple the hinge member to the support bracket assembly.

21. A gear assembly, as set forth in claim 20, wherein each hinge body includes a cable cavity that extends through the hinge body from the radially inner surface to the second end, the cable cavity being configured to receive one or more power and/or communication cables.

22. A gear assembly, as set forth in claim 21, further including one or more magnets coupled to the outer surface of the hinge body to facilitate positioning of the wing members in the stowed and deployed positions.

* * * * *